US012669095B2

(12) United States Patent
Johnson et al.

(10) Patent No.: US 12,669,095 B2
(45) Date of Patent: Jun. 30, 2026

(54) ENGINE SHUTOFF PROFILE FOR HYBRID VEHICLE GASOLINE PARTICULATE FILTER REGENERATION

(71) Applicant: FCA US LLC, Auburn Hills, MI (US)

(72) Inventors: Lonny E Johnson, Auburn Hills, MI (US); Ryan C Masters, Auburn Hills, MI (US); Anthony L Gancer, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 10 days.

(21) Appl. No.: 18/961,795

(22) Filed: Nov. 27, 2024

(65) Prior Publication Data

US 2026/0146571 A1 May 28, 2026

(51) Int. Cl.

| | |
|---|---|
| ***F02D 41/02*** | (2006.01) |
| ***F01N 3/023*** | (2006.01) |
| ***F02D 41/00*** | (2006.01) |
| ***F02D 41/04*** | (2006.01) |

(52) U.S. Cl.

CPC ......... *F02D 41/029* (2013.01); *F02D 41/042* (2013.01); *F01N 3/023* (2013.01); *F01N 3/0233* (2013.01); *F01N 3/0238* (2013.01); *F01N 2430/02* (2013.01); *F01N 2590/11* (2013.01); *F02D 2041/0012* (2013.01); *F02D 2200/0802* (2013.01); *F02D 2200/0812* (2013.01)

(58) Field of Classification Search

CPC combination set(s) only.

See application file for complete search history.

(56) References Cited

U.S. PATENT DOCUMENTS

| | | | | |
|---|---|---|---|---|
| 11,919,505 | B2 * | 3/2024 | Sugimoto | F02D 41/222 |
| 12,110,816 | B1 | 10/2024 | Schubring et al. | |
| 2019/0017423 | A1 * | 1/2019 | Martin | F01N 9/002 |
| 2019/0032585 | A1 * | 1/2019 | Kelly | F02D 41/029 |
| 2020/0031333 | A1 * | 1/2020 | Onuma | F01N 9/00 |
| 2020/0049085 | A1 * | 2/2020 | Kuroda | F02D 41/029 |
| 2021/0107452 | A1 * | 4/2021 | Nose | F02D 29/02 |
| 2022/0195955 | A1 * | 6/2022 | Sugimoto | F02D 41/029 |

* cited by examiner

*Primary Examiner* — Binh Q Tran

(74) *Attorney, Agent, or Firm* — Jeremy J. Klobucar

(57) ABSTRACT

A hybrid electric vehicle (HEV) includes an internal combustion engine, an electric traction motor, and a motor/generator configured to drive the internal combustion engine or be driven by the internal combustion engine to generate electricity to charge a high voltage battery and/or drive the electric traction motor. An exhaust aftertreatment system includes a gasoline particulate filter (GPF), and a control system includes a controller for monitoring and performing a regeneration operation of the GPF. The controller is programmed to determine the GPF needs to be regenerated, and determine if a temperature of the GPF meets or exceeds a predetermined threshold indicating a GPF regeneration can occur. Upon an engine shutdown event, if the temperature meets or exceeds the predetermined threshold, the controller gradually spins down a speed of the internal combustion engine in fuel shut-off to generate a flow of air to the GPF to initiate a GPF regeneration.

19 Claims, 3 Drawing Sheets

ENGINE SHUTOFF PROFILE FOR HYBRID VEHICLE GASOLINE PARTICULATE FILTER REGENERATION

FIELD

The present application relates generally to vehicle engine exhaust treatment systems and, more particularly, to systems for gasoline particulate filter regeneration in hybrid vehicles.

BACKGROUND

Gasoline Particulate Filters (GPF) are utilized in internal combustion engine (ICE) exhaust systems to remove particulate matter (soot) from the engine exhaust. GPF's typically require periodic cleaning (regeneration) to remove accumulated soot by increasing the exhaust temperature to initiate a combustion of the soot. Some conventional ICE vehicles utilize fuel shut-off (FSO) when engine power is not required, which allows for oxygen to reach the GPF. When the GPF is hot enough, a reaction occurs with the oxygen to oxidize the soot and clean the GPF. However, in some hybrid vehicles, the engine is completely shut-off when engine power is not required, thereby preventing oxygen from reaching the GPF. Accordingly, while such conventional systems work well for their intended purpose, there is a desire for improvement in the relevant art.

SUMMARY

In accordance with one example aspect of the invention, a hybrid electric vehicle (HEV) is provided. In one example implementation, the HEV includes an internal combustion engine, one or more electric traction motors configured to provide drive torque to one or more vehicle axles, and a motor/generator configured to drive the internal combustion engine or be driven by the internal combustion engine to generate electricity to charge a high voltage battery and/or drive the one or more electric traction motors. An exhaust aftertreatment system includes a gasoline particulate filter (GPF), and a control system includes a controller for monitoring and performing a regeneration operation of the GPF. The controller is programmed to determine the GPF needs to be regenerated, and determine if a temperature of the GPF meets or exceeds a predetermined threshold indicating a GPF regeneration can occur. Upon an engine shutdown event, if the temperature meets or exceeds the predetermined threshold, the controller gradually spins down a speed of the internal combustion engine in fuel shut-off to generate a flow of air to the GPF to initiate a GPF regeneration.

In addition to the foregoing, the described HEV may include one or more of the following features: wherein the controller is further programmed to monitor a soot accumulation of the GPF; wherein the controller is further programmed to determine if the soot accumulation meets or exceeds a predetermined threshold indicating the GPF needs to be regenerated; wherein the controller is further programmed to gradually spin down the internal combustion engine according to a coast-down shutdown profile; and wherein if the GPF temperature does not meet or exceed the predetermined threshold, the controller is further programmed to shut off the internal combustion engine without the gradual spin down.

In addition to the foregoing, the described HEV may include one or more of the following features: a crankshaft rotatably coupled between the engine and the motor/generator, wherein the motor/generator is utilized to rotate the crankshaft to gradually spin down the internal combustion engine; wherein during the GPF regeneration, the controller is further programmed to perform a closed loop GPF control to monitor and meter the flow of air to the GPF; wherein the controller is further programmed to determine the GPF regeneration is complete, and return the HEV to a normal operation by turning the engine off or ceasing the fuel shut-off; and wherein the HEV is a series hybrid electric vehicle.

In accordance with another example aspect of the invention, a method of operating a hybrid electric vehicle (HEV) is provided. The HEV includes one or more electric traction motors configured to provide drive torque to one or more vehicle axles, an internal combustion engine, a motor/generator configured to drive the internal combustion engine or be driven by the internal combustion engine to generate electricity to charge a high voltage battery and/or drive one or more electric traction motors, and an exhaust aftertreatment system having a gasoline particulate filter (GPF).

In one example implementation, the method includes determining, by a controller having one or more processors, if the GPF needs to be regenerated; determining, by the controller, if a temperature of the GPF meets or exceeds a predetermined threshold indicating a GPF regeneration can occur; and upon an engine shutdown event, if the temperature meets or exceeds the predetermined threshold, gradually spinning down a speed of the internal combustion engine in fuel shut-off to generate a flow of air to the GPF to initiate a GPF regeneration.

In addition to the foregoing, the described method may include one or more of the following features: monitoring, by the controller, a soot accumulation of the GPF; determining, by the controller, if the soot accumulation meets or exceeds a predetermined threshold indicating the GPF needs to be regenerated; gradually spinning down the internal combustion engine, by the controller and the motor/generator, according to a coast-down shutdown profile; and if the GPF temperature does not meet or exceed the predetermined threshold, shutting off the internal combustion engine without the gradual spin down.

In addition to the foregoing, the described method may include one or more of the following features: wherein the HEV further includes a crankshaft rotatably coupled between the engine and the motor/generator, wherein the motor/generator is utilized to rotate the crankshaft to gradually spin down the internal combustion engine; during the GPF regeneration, performing, by the controller, a closed loop GPF control to monitor and meter the flow of air to the GPF; determining, by the controller, the GPF regeneration is complete, and returning, by the controller, the HEV to a normal operation by turning the engine off or ceasing the fuel shut-off; and wherein the HEV is a series hybrid electric vehicle.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, a gasoline particulate filter (GPF) cannot be regenerated (cleaned) by conventional means in hybrid electric vehicles (HEVs) since the internal combustion engine is shut off when engine power is not required. Accordingly, described herein are systems and methods to regenerate a GPF in a hybrid electric vehicle. In general, the system is configured to periodically start the engine to charge the battery system and/or provide additional vehicle propulsion. When the engine-on is no longer required, rather than completely shut the engine off, the system commands the engine shutdown and electrically motors the engine (without fueling) according to a predefined coast-down profile. This profile allows the engine to gradually spin down, to thereby send oxygen to the GPF to encourage passive regeneration, which relies on the GPF being hot enough to oxidize accumulated soot.

Figure 1:
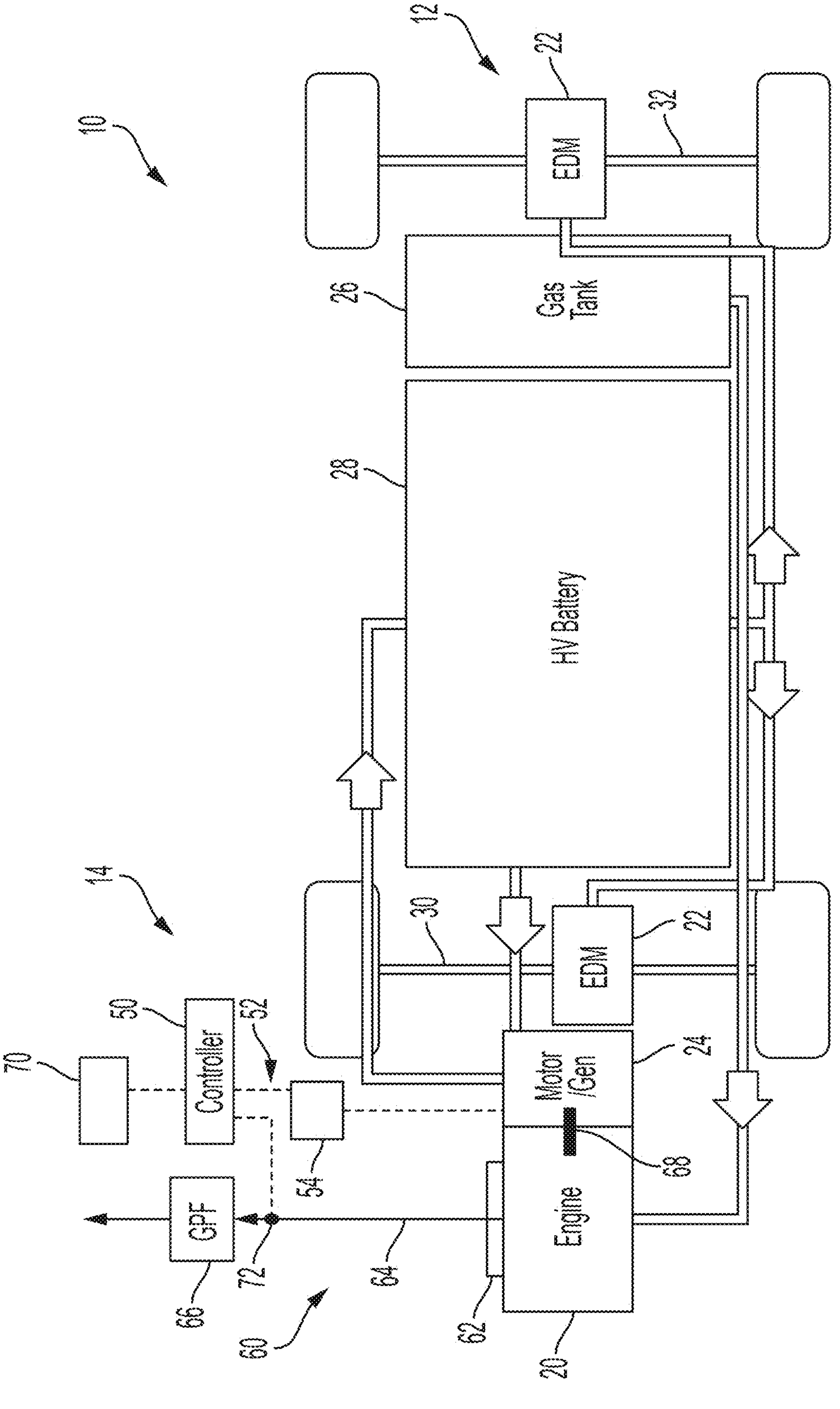
FIG. 1 is a schematic illustration of an example series hybrid electric vehicle architecture in accordance with the principles of the present application.

With initial reference to FIG. 1, a schematic diagram of a series hybrid electric vehicle (HEV) 10 is illustrated having a hybrid powertrain 12 and a powertrain control system 14 according to example implementations of the disclosure. In the illustrated example, the powertrain 12 generally includes an internal combustion engine 20, one or more electric drive modules (EDM) 22, and a motor/generator 24.

The engine 20 receives fuel (e.g., gasoline) from a fuel tank 26 and combusts a mixture of air and fuel within cylinders to drive pistons and generate torque. The generated torque drives the motor/generator 24 to produce electricity to charge a high voltage (HV) battery 28. In other operations, the motor/generator 24 is powered by the HV battery 28 (e.g., via a low voltage battery system) and is also utilized to control engine stop/start operations to improve vehicle fuel economy. The EDMs 22, which include an electric traction motor, are powered by the HV battery 28 to selectively provide drive torque to a front axle 30 and/or a rear axle 32. In this way, the HEV 10 includes a low voltage battery system (not shown) configured to support various 12V loads of the HEV 10, for example, to power various electrical components or start the engine 20, and the high voltage battery 28 is configured to power high voltage loads such as the EDMs 22.

In the example embodiment, the hybrid powertrain 12 is controlled by the powertrain control system 14, which generally includes one or more controllers 50, such as a hybrid control processor (HCP) and/or engine control unit (ECU). The controller 50 is a central supervisory control configured to communicate with various components/modules of the hybrid powertrain 12 via a CAN bus 52. For example, the controller may be in signal communication with a motor control processor (MCP) 54 for control of the motor/generator 24.

With continued reference to FIG. 1, the internal combustion engine 20 is connected to an exhaust aftertreatment system 60 that generally includes an exhaust manifold 62, an exhaust passage 64, and a gasoline particulate filter (GPF) 66 disposed along the exhaust passage 64 and configured to collect and remove particulate matter. In general, the engine 20 combusts a mixture of fuel and air to drive pistons (not shown) that rotatably turn a crankshaft 68 to generate drive torque. The drive torque is transferred to the motor/generator 24 to generate electricity, which is subsequently stored in the HV battery 28. Although not shown, the exhaust aftertreatment system 60 may include or more catalytic converters to reduce or convert a desired exhaust gas constituent such as, for example, carbon monoxide (CO), hydrocarbon (HC), and/or nitrogen oxides (NOx).

The exhaust aftertreatment system 60 also includes an onboard monitoring system 70 in signal communication with the controller 50 to monitor the GPF 66. The monitoring system 70 may include one or more models (e.g., stored in controller 50) to determine an amount of particulate matter (soot) buildup in the GPF 66. The monitoring system 70 may also include or more sensors 72 for monitoring the GPF 66, such as a temperature sensor to monitor a temperature of the GPF 66 to determine if the GPF temperature has exceeded a predetermined threshold for GPF regeneration. The sensor 72 may also include delta pressure sensors configured to sense if the GPF 66 is full, including sensors disposed upstream and downstream (not shown) of the GPF 66 to determine a pressure differential thereof. In this way, controller 50 and monitoring system 70 are configured to monitor the exhaust aftertreatment system 60 to determine if conditions exist to initiate a GPF regeneration. Accordingly, as described herein in more detail, powertrain control system 14 is configured to perform a passive or active regeneration of the GPF 66 of the series hybrid EV 10.

Figure 2:
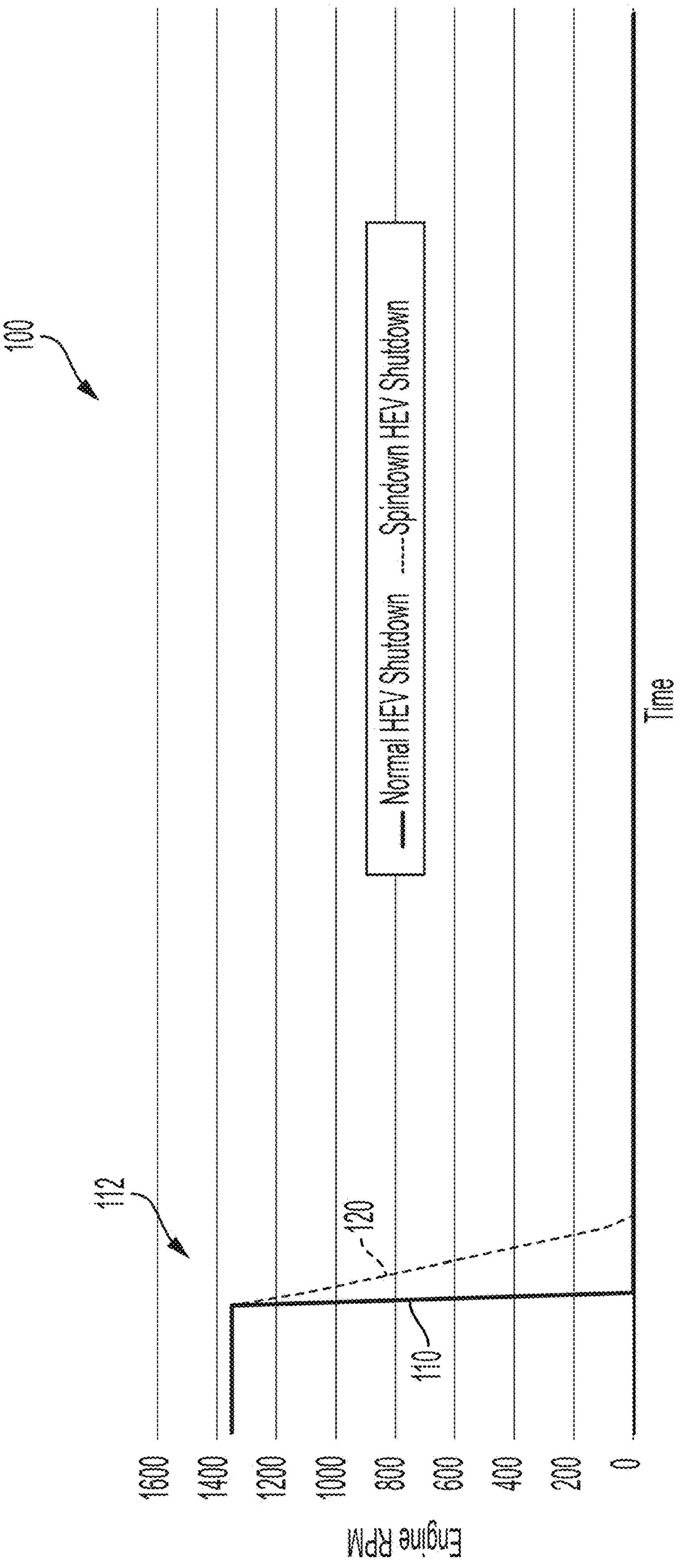
FIG. 2 is a graph illustrating an example engine coast-down shutdown profile for performing a gasoline particulate filter regeneration, in accordance with the principles of the present application.

With reference now to FIG. 2, a graph 100 illustrating an example engine shutdown profile for a GPF regeneration is shown in accordance with the principles of the present disclosure. The Y-axis represents an example engine RPM, and the X-axis represents time. In the example illustration, line 110 represents a conventional engine shutdown where engine RPM immediately drops to zero when the engine is shut down at point 112. However, according to principles of the present disclosure, once the engine 20 is shut down at point 112 (and fuel is shut off), the electric motor 24 is utilized to spin-down the engine speed (RPM) according to a coast-down shutdown profile, shown by line 120. This gradual coast-down of the engine RPM continues to provide intake air to the GPF 66 to advantageously enable GPF regeneration after engine shutdown.

Figure 3:
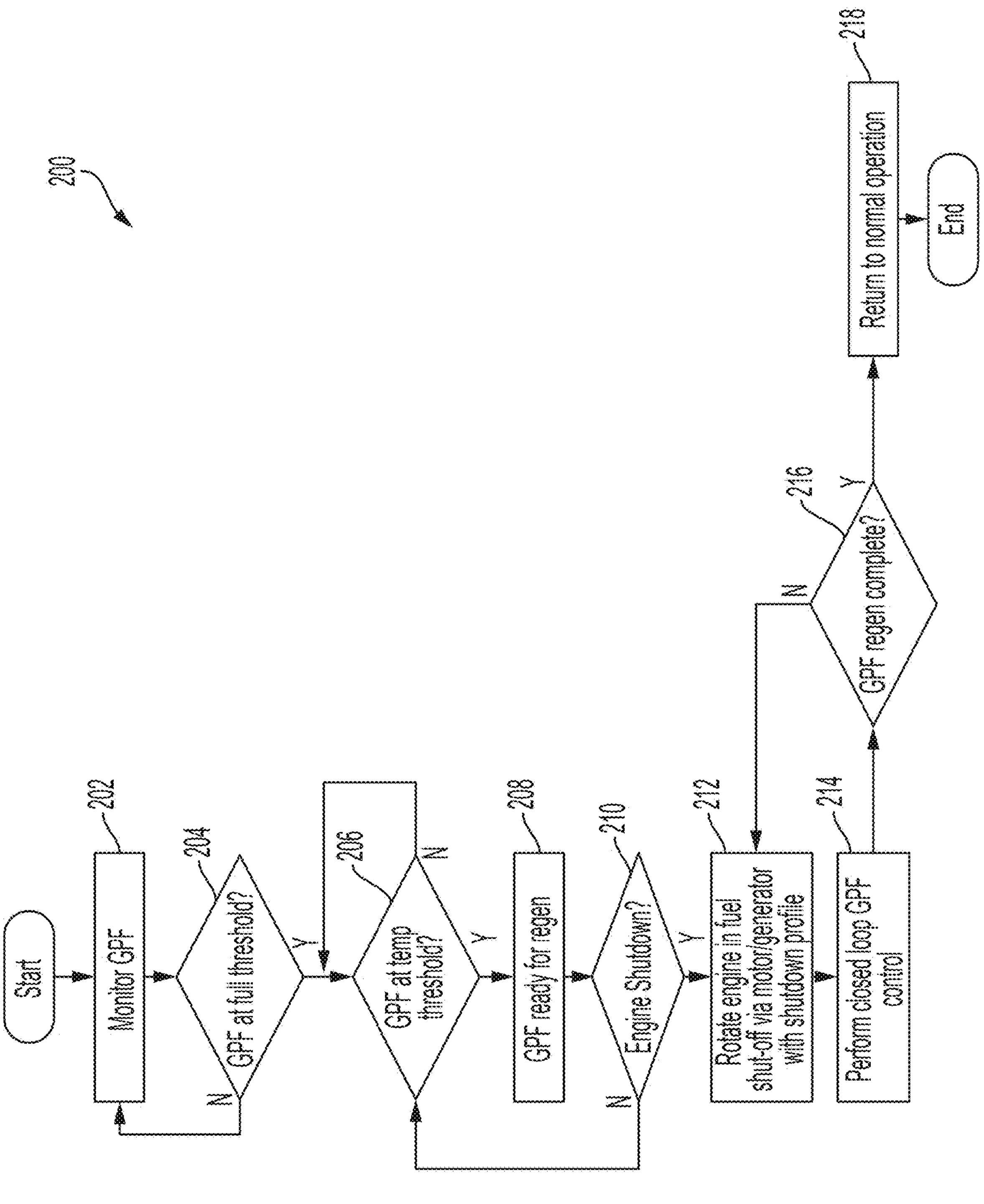
FIG. 3 illustrates an example control logic flow for performing a gasoline particulate filter regeneration in the hybrid electric vehicle shown in FIG. 1, in accordance with the principles of the present application.

With reference now to FIG. 3, a flow diagram of an example GPF regeneration method 200 for a HEV is illustrated according to the principles of the present application. While the method 200 specifically references the HEV 10 and its components for illustrative/descriptive purposes, it will be appreciated that the method 200 could be applicable to any suitably configured electrified vehicle.

In the example embodiment, the method 200 begins at step 202 and controller 50 ("control") monitors the GPF 66 soot level and temperature, for example, via onboard monitoring system 70 and temperature sensor 72. At step 204, control determines if GPF soot accumulation is greater than a predetermined threshold (e.g., at or near "full" accumulation). In one example, this determination is made based on a model stored in the onboard monitoring system 70 and/or controller 50. If the GPF 66 is not full, control returns to step 202. If the GPF 66 is full, control proceeds to step 206.

In the example embodiment, at step 206, control determines if a temperature of the GFP 66 is greater than or equal to a predetermined regeneration temperature suitable for performing a GPF regeneration operation (e.g., a temperature for oxidation to occur). If yes, control proceeds to step 208 to perform a passive regeneration operation. If no, control returns to step 206.

If the GPF temperature is above the predetermined regeneration temperature, control proceeds to step 208 and determines the GPF 66 is ready for a regeneration operation. At 210, control determines if an engine shutdown is commanded. If no, control returns to step 206. If yes, at 212, control shuts the engine down and operates the motor/generator 24 to spin the engine 20 (via crankshaft 68) in fuel shut-off according to the predetermined engine shutdown profile 120. In this way, while spinning down, the engine 20 generates a flow of air (without fuel) through the exhaust passage 64 to the GPF 66 to initiate GPF regeneration.

In additional optional control, at step 214, control monitors the GPF 66 and performs a closed loop GPF control of the GPF 66 to ensure proper regeneration. For example, control monitors and meters airflow, temperature, and soot level at the GPF 66 via onboard monitoring system 70 (models) and temperature sensor 72. At step 216, control determines if the GPF regeneration operation is complete. If no, control returns to step 212. If yes, control proceeds to step 218 and returns the HEV 10 to a normal operation. For example, depending on the desired operation, control turns engine 20 off or resumes supply of fuel to engine 20. Control then ends or returns to step 202.

Described herein are systems and methods for regenerating a GPF in a series hybrid electric vehicle. The system monitors the GPF soot level and when a regeneration is required, the system determines if the GPF is at a regeneration temperature. If yes, the system proceeds with a passive regeneration operation when the engine is shut down. The system then operates the engine in fuel shut-off according to a predetermined engine spin-down profile to generate a flow of air to the GPF to initiate the regeneration operation. The system may then monitor and control airflow to thereby control the regeneration and return to normal operation when the GPF regeneration is complete.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A hybrid electric vehicle (HEV), comprising:

an internal combustion engine;

one or more electric traction motors configured to provide drive torque to one or more vehicle axles;

a motor/generator configured to drive the internal combustion engine or be driven by the internal combustion engine to generate electricity to charge a high voltage battery and/or drive the one or more electric traction motors;

an exhaust aftertreatment system having a gasoline particulate filter (GPF); and a control system including a controller for monitoring and performing a regeneration operation of the GPF, wherein the controller is programmed to:

determine the GPF needs to be regenerated;

determine if a temperature of the GPF meets or exceeds a predetermined threshold indicating a GPF regeneration can occur; and upon an engine shutdown event, if the temperature meets or exceeds the predetermined threshold, gradually spin down a speed of the internal combustion engine in fuel shut-off to generate a flow of air to the GPF to initiate a GPF regeneration.

2. The HEV of claim 1, wherein the controller is further programmed to monitor a soot accumulation of the GPF.

3. The HEV of claim 2, wherein the controller is further programmed to determine if the soot accumulation meets or exceeds a predetermined threshold indicating the GPF needs to be regenerated.

4. The HEV of claim 1, wherein the controller is further programmed to gradually spin down the internal combustion engine according to a coast-down shutdown profile.

5. The HEV of claim 1, wherein if the GPF temperature does not meet or exceed the predetermined threshold, the controller is further programmed to shut off the internal combustion engine without the gradual spin down.

6. The HEV of claim 1, further comprising a crankshaft rotatably coupled between the engine and the motor/generator, wherein the motor/generator is utilized to rotate the crankshaft to gradually spin down the internal combustion engine.

7. The HEV of claim 1, wherein during the GPF regeneration, the controller is further programmed to perform a closed loop GPF control to monitor and meter the flow of air to the GPF.

8. The HEV of claim 1, wherein the controller is further programmed to:

determine the GPF regeneration is complete; and return the HEV to a normal operation by turning the engine off or ceasing the fuel shut-off.

9. The HEV of claim 1, wherein the HEV is a series hybrid electric vehicle.

10. A method of operating a hybrid electric vehicle (HEV) having one or more electric traction motors configured to provide drive torque to one or more vehicle axles, an internal combustion engine, a motor/generator configured to drive the internal combustion engine or be driven by the internal combustion engine to generate electricity to charge a high voltage battery and/or drive one or more electric traction motors, and an exhaust aftertreatment system having a gasoline particulate filter (GPF), the method comprising:

determining, by a controller having one or more processors, if the GPF needs to be regenerated;

determining, by the controller, if a temperature of the GPF meets or exceeds a predetermined threshold indicating a GPF regeneration can occur; and upon an engine shutdown event, if the temperature meets or exceeds the predetermined threshold, gradually spinning down a speed of the internal combustion engine in fuel shut-off to generate a flow of air to the GPF to initiate a GPF regeneration.

11. The method of claim 10, further comprising monitoring, by the controller, a soot accumulation of the GPF.

12. The method of claim 11, further comprising determining, by the controller, if the soot accumulation meets or exceeds a predetermined threshold indicating the GPF needs to be regenerated.

13. The method of claim 10, further comprising gradually spinning down the internal combustion engine, by the controller and the motor/generator, according to a coast-down shutdown profile.

14. The method of claim 10, further comprising, if the GPF temperature does not meet or exceed the predetermined threshold, shutting off the internal combustion engine without the gradual spin down.

15. The method of claim 10, wherein the HEV further includes a crankshaft rotatably coupled between the engine and the motor/generator, wherein the motor/generator is utilized to rotate the crankshaft to gradually spin down the internal combustion engine.

16. The method of claim 10, further comprising, during the GPF regeneration, performing, by the controller, a closed loop GPF control to monitor and meter the flow of air to the GPF.

17. The method of claim 10, further comprising:

determining, by the controller, the GPF regeneration is complete; and returning, by the controller, the HEV to a normal operation by turning the engine off or ceasing the fuel shut-off.

18. The method of claim 10, wherein the HEV is a series hybrid electric vehicle.

19. The HEV of claim 1, wherein when gradually spinning down the speed of the internal combustion engine, the controller is programmed to utilize the motor/generator to electrically motor the internal combustion engine without fueling, according to a pre-defined coast-down profile.

* * * * *